H. FLICKER.
TREATMENT OF SEWAGE FOR THE PURIFICATION THEREOF AND THE PRODUCTION OF COMBUSTIBLE GAS THEREFROM.
APPLICATION FILED FEB. 24, 1917.
1,314,955.
Patented Sept. 2, 1919.
2 SHEETS—SHEET 1.
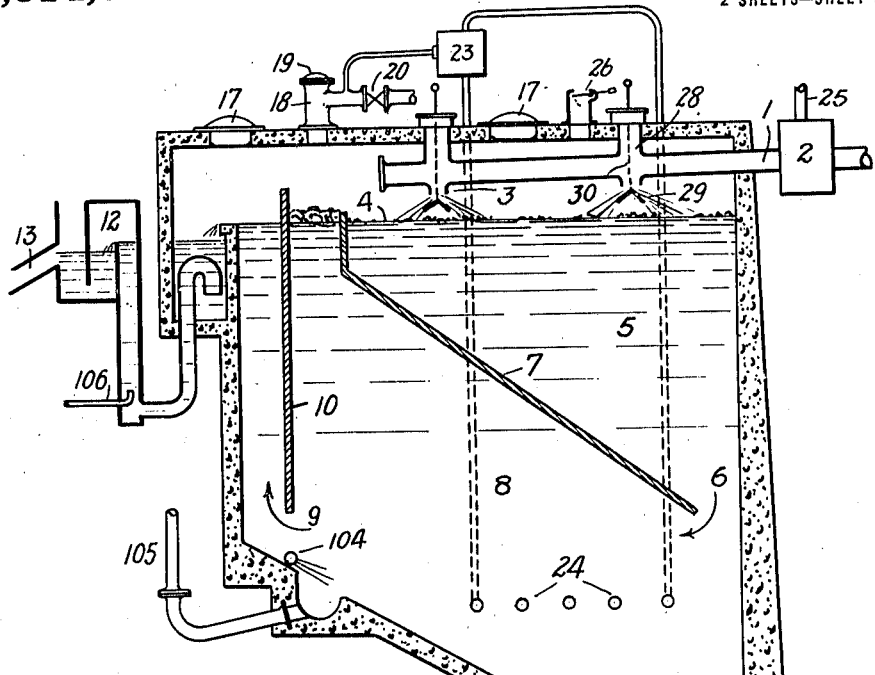
FIG. 2
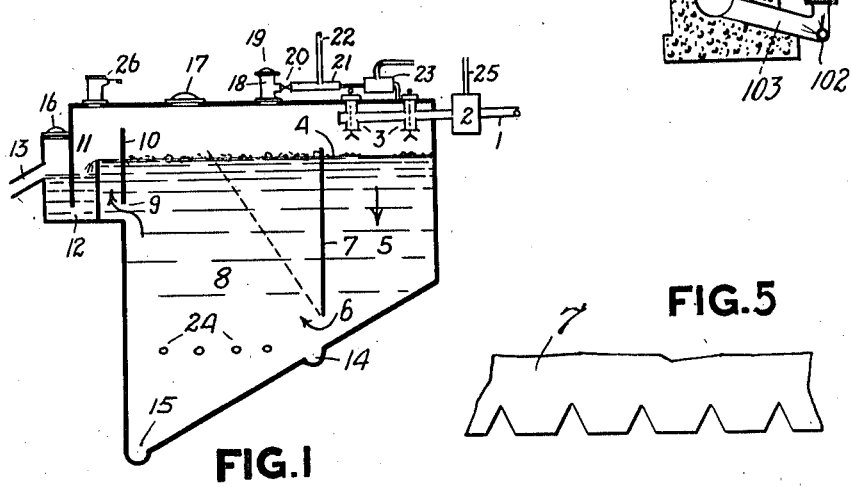
FIG. 1
FIG. 5
Inventor,
Horace Flicker.
By his Attorneys,
Meyers, Cushman & Rea H. FLICKER.
TREATMENT OF SEWAGE FOR THE PURIFICATION THEREOF AND THE PRODUCTION OF COMBUSTIBLE GAS THEREFROM.
APPLICATION FILED FEB. 24, 1917.

1,314,955.

Patented Sept. 2, 1919.

Inventor,
Horace Flicker.
By his Attorneys.

UNITED STATES PATENT OFFICE.

HORACE FLICKER, OF PARRAMATTA, NEW SOUTH WALES, AUSTRALIA.

TREATMENT OF SEWAGE FOR THE PURIFICATION THEREOF AND THE PRODUCTION OF COMBUSTIBLE GAS THEREFROM.

1,314,955.     Specification of Letters Patent.   Patented Sept. 2, 1919.

Application filed February 24, 1917. Serial No. 150,708.

*To all whom it may concern:*

Be it known that I, HORACE FLICKER, subject of the King of Great Britain and Ireland, residing at Parramatta, New South Wales, Australia, have invented new and useful Improvements in the Treatment of Sewage for the Purification Thereof and the Production of Combustible Gas Therefrom, of which the following is a specification.

This invention relates to the treatment in purifying tanks of domestic and town sewage including sewage containing manufacturers' waste or organic matter other than sewage for the production of an effluent conditioned for final purification by retreatment in aerifying filters or in other known ways, and for the generation of combustible gas usable as a source of light, heat and power as a by-product of said purification treatment.

It is found in practice that when sewage is introduced into the lower part of a single chamber purification tank and the effluent produced by the operation of the processes which occur in said tank is withdrawn at a point in said tank distant from the point of introduction of the sewage thereinto, the period of rest to which the flowing sewage is subjected is often indeterminate and is governed by uncontrollable causes. Notwithstanding that the capacity of the tank in relation to the rate of flow of sewage delivered to it is proportioned, with a view to the detention of said sewage for a predetermined period of rest, yet after the tank has been operated for a considerable time, the flowing sewage makes for itself a narrow and more or less direct course from the inlet to the outlet point, and substantially no flow occurs through the other portions of the tank. This results in a too rapid transfer of the flowing sewage from the inlet to the outlet, so that the effluent carries with it undigested matter not conditioned for final treatment by aerification. Furthermore a heavy scum or crust is usually produced when anaerobic conditions predominate in any part of the tank, and bacterial processes upon the performance of which effective resolution of the sewage depends, are inhibited or disturbed. In recent practice various types of purifying tanks on the "two storied" or "three storied" principle have been adopted. In these tanks the liquid matters are separated from the precipitable matters contained in the sewage which latter deposit as sludge and suffer digestion, the sludge passing into a lower chamber where it remains for a relatively long period undergoing digestion, while the liquid elements flow through an upper chamber of the tank in the course of a very few hours, in such a way that their motion does not disturb sludge which is undergoing resolution in the lower story of the tank. It has been observed that in the two-storied and three-storied types of tank a greater volume of gas is produced than in the single chamber or serial chamber type of tank, and furthermore that in the two-storied and three-storied types of tank the evolved gases are usually not foul smelling.

The evolution of foul smelling gases is traceable to a prolonged fermentative action on elements which are for the most part contained in the liquid portions of the sewage, and consequently when the liquid portions of the sewage are delivered out of the tank before the fermentation has progressed to an advanced stage and while some free oxygen remains, noisome conditions due to the evolution of foul gases are minimized. Gas is generated in the sludge by bacterial and enzymic processes, and the mass of the sludge suffers resolution and its mechanical condition undergoes a change. In the fermentative action in the sludge gas is evolved, and the gas films and particles operate to buoy or float the lighter sludge particles until said gas films and particles coalesce and form gas bubbles, when they separate from the sludge and pass up out of the supernatant liquid in the tank. It is found that the upper portions of the sludge deposit are thus subjected to intermittent flotation and that the scum crust is thickened by floated matter which becomes attached to it. It would appear probable that generation of further gas is diminished to a greater or less extent at the surface of each particle as gas is produced thereon, because the gas so produced envelops the particle and inhibits the progress of further fermentative action. Rapid separation of gas from sewage solids is therefore desirable.

The prevention of heavy scum formation is also a desideratum, as the capsuling of the tank with scum locks the gas below it.

In all the known types of purification tanks, whether of the one, two, or three storied type, or the serial chamber type, the flow of the sewage is substantially horizontal or upward.

I have ascertained experimentally that in all these methods and apparatus for the purification of sewage, in which the sewage is introduced into a tank directly from the sewer or the collecting pits in which the sewer terminates, speedy and effective resolution of the sewage is slackened and curtailed, because in the first place the sewage does not carry with it into the tank a sufficiency of oxygen to support the aerobic fermentation process on which its resolution mainly depends, and further that the process of resolution may be hastened by providing a means whereby evolved gases are more rapidly removed from the sludge particles on or among which they are formed. It is necessary that irrespectively of the type of tank in which the resolution is being accomplished, the fermenting sludge shall be substantially digested, and consequently any method or apparatus for tank treatment of sewage which involves agitation of the sludge bed is objectionable. Therefore, given conditions in which a sufficiency of oxygen to support the aerobic fermentative process is introduced into the tank with the sewage, and the fermentative processes are permitted to operate readily by the continuous withdrawal of the gaseous products of fermentation, and further given conditions insuring effective distribution of the sewage flow through the tank, a limited scum condition, a hastening of the purification, and an improvement in the purity of the effluent are obtained simultaneously with the production of large volumes of combustible gases and usually without the production of foul smelling gases such as sulfureted hydrogen, or with only a limited quantity of such noisome gases.

It is also most desirable, as is already well known, that the temperature of the fermenting sewage shall be maintained within a certain range, and my invention includes economical means whereby the temperature of sewage under treatment is maintained within a satisfactory range under adverse climatic conditions.

The process may be carried out in apparatus in either of several forms, all, however, substantially identical in the relation and functioning of the parts therein.

Figure 1 shows a semi diagrammatic section of a purification tank with the necessary appurtenances, in an elementary form, the dotted line representing an alternative position of the tank septum;

Fig. 2 is a transverse section of a rectangular tank practically identical with the tank shown in elementary form in Fig. 1.

Figure 3:
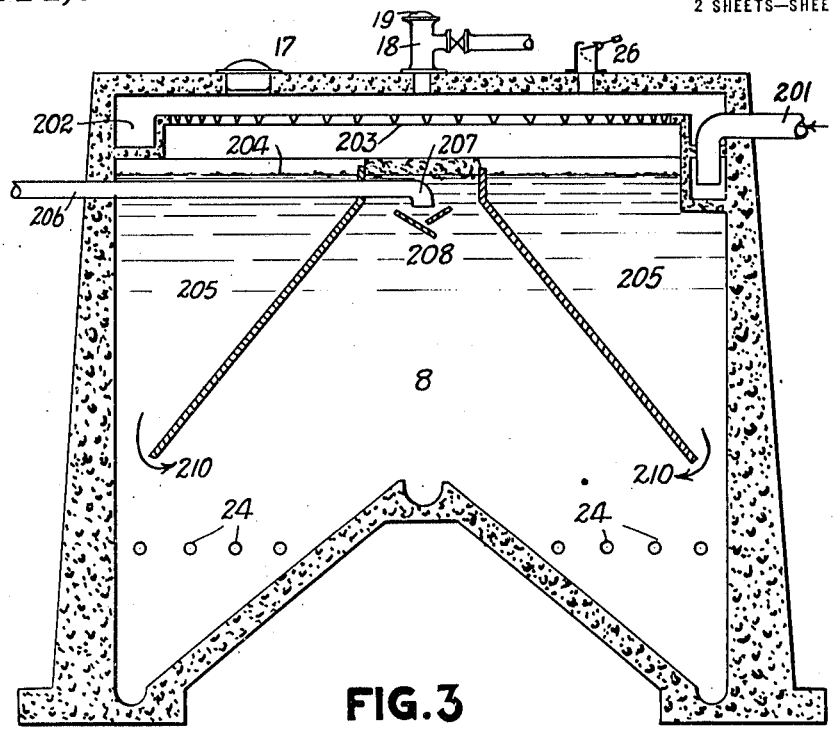
Figure 4:
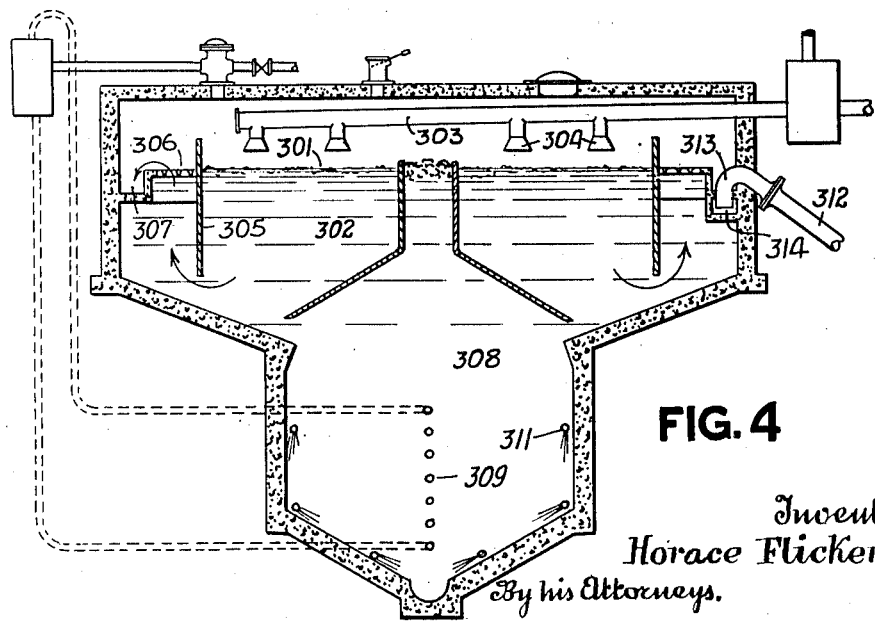

In this tank the flow of sewage is transverse of the tank;

Fig. 3 is a transverse section through a radial flow tank;

Fig. 4 is a transverse section through a tank of the two-storied type, arranged to be operated according to this invention;

Fig. 5 is a detail view in elevation of a part of the lower portion of the septum illustrated in Figs. 1 and 2 and showing the serrated edge of the septum.

In all these cases the tank is arranged with a view to the collection of the combustible gas; but where that is not necessary the top of the tank may be open and the valves and gas apparatus omitted.

Referring to Figs. 1 and 2, 1 is the sewer line, 2 an apparatus for introducing air into the sewage before it enters the tank, 3 are sprinklers adapted to spray the aerated sewage on to the surface 4 of the body of sewage contained in the receiving chamber 5 of the tank. To facilitate cleaning, an access pipe 28 is fitted above each sprinkler. This pipe emerges through the top of the tank and is capped, and the distributer 29 of the sprinkler nozzle is suspended by a rod or chain 30. When the cap is raised a brush may be introduced and the surfaces cleaned. 6 is a passage below the tank septum 7 extending the full length thereof. 8 is the sludge chamber, 9 the effluent vent, 10 effluent baffle, 11 overflow sill, 12 trap box, 13 effluent pipe, 14 and 15 sludge channels, 16 hand hole, 17 man hole, 18 gas neck, 19 cap thereon, 20 gas valve, 21 gas offtake pipe, 22 gas branch, 23 heater, 24 heater coils. 25 air pipe leading into aerifying device 2. 26 is a non return air inlet valve, which is normally kept lightly closed by a spring or counterweight. The cap 19 is weighted and operates as a safety valve. The top edge of the septum 7 is level and is disposed very slightly above the normal sewage level in the tank. The lower edge of the septum 7 is serrated, as shown in Fig. 5, in order to insure distribution of the flow of sewage from the chamber 5 to the chamber 8, so as to prevent the sewage forming one or more gutterways and so making a short circuit to the effluent vent 9. The septum 7 may be arranged in angular position as shown by the dotted line 27. The tank is completely sealed in order to store the gas generated in the bacterial processes which occur in the tank, but if the gas collection is not sought, the top of the tank may be left open and the gas apparatus omitted. The heater 23 is heated by gas drawn from the tank, and serves to maintain a supply of hot water or steam to the pipes 24, with the object of maintaining a degree of temperature in the tank sufficiently high to encourage the required bacterial activity therein. The heater 23 may also be used to supply steam which may be utilized in an injector (not shown) to force air into the pipe 25, but air may be forced through said pipe otherwise. The aerating device 2 may be of any convenient type, so long as it is designed to introduce into the sewage a regulated proportion of atmospheric air for the purpose of promoting and supporting aerobic bacterial processes in the tank. Gas drawn through the pipe branch 22 may be used for motive power, heating, or illuminating purposes. It will be noted that the outflowing sewage passing over the sill 11 is broken up, and discharge of the gases occluded in it or attached to particles contained in it is thereby facilitated. The gas so freed passes over the top of the baffle 10 into the top of the tank proper.

The proportion of air introduced into the sewage in the aerating device 2 must be regulated and limited so as not to exceed that quantity which would so dilute the gases evolved from the sewage as to bring the said gases within the combustible range, but up to that point it is desirable that the sewage should be as freely aerated as possible in order to suppress anaerobic conditions in the tank.

Before the sewage is brought to the aerating device 2 it is passed through gratings and sedimenting pits to abstract tins, stones, silt, and other such solid matter. The rate of flow may be controlled as is usual by operating a plurality of tanks and distributing the flow appropriately between them.

The sewage flows downward in the sedimenting and oxidizing chamber 5, thence through the vent 6, under the septum 7, and over the top of the sludge bed in the chamber 8, finding exit through the effluent vent 9. Substances precipitated in the chambers 5 and 8 accumulates as sludge in the bottom of the chamber 8. When the sludge level rises to the channel 14 the volume is reduced by drawing off the bottom portions through the sludge gutter 15. Sludge pumps used for this purpose may be of any ordinary type and are not indicated in the drawings. Hot water or steam passing through the pipes 24, or steam emitted from holes in said pipes upwardly, operates to maintain an appropriate temperature in the sewage so as to promote generation of aerobic bacterial life and sustain it. The sewage flowing across the top of the sludge from the vent 6 to the vent 9 lightly disturbs the top of the sludge without agitating the mass of it and so promotes the liberation of gas attached to or entrained in the upper strata of sludge particles, so that said gas is further discharged from the sludge. Under those conditions of operation the surface 4 of the sewage in the chamber 5 is maintained exposed, a filmy discontinuous scum only forming on it. The scum formation in the chamber 8 will also be limited and will be a minimum when the aeration of the sewage is controlled so that the sewage still contains some free oxygen when it leaves the vent 9. This relatively thin scum will not imprison gas in the chamber 8, but will allow it to pass more or less freely into the roof portion of the tank whence it is drawn off through the gas head 18.

In Fig. 2 the same letters and figures of reference are used as in Fig. 1, but the detail of the apparatus used is shown with a little more particularity. It is to be observed that in the operation of this tank it is desirable that the flowing sewage shall suffer a detention of from (say) two to six hours only, while the sludge will be allowed to accumulate until the sludge pit becomes fully charged. Several months will usually be occupied in the filling of the sludge pit.

The additional features illustrated in Fig. 2, are the sludge draw-off pipe 101, the water spray pipe 102 for the purpose of clearing the foot of the pipe 101, and the tail pipe 103, water spray pipes 104 on the bottom of the tank for the purpose of promoting removal of the sludge, sludge try pipe 105, and the supplementary aerating pipe 106 through which air is introduced into the effluent before same passes into the effluent pipe 13. It will be noted that in Fig. 1 the sewage vent 9 is shown above midway level in the tank, while in Fig. 2 it is shown slightly above the normal sludge level. The operation of the process does not depend upon any exactness in the vertical position of the vent 9. It will suffice if said vent be placed so that the course of the sewage undergoing transverse flow is substantially horizontal or is angular upwardly from the vent 6 so long as the vent 9 is well submerged.

In Fig. 3, which displays the tank constructed on the radial flow principle, sewage which enters through the pipe 201 is distributed through the ring gutter 202, flowing over the lip of same through the notches 203 therein, and dropping on to the surface 204 of the sewage contained in the annular receiving chamber 205. The sewage is drawn off through the effluent pipe 206, the mouth of which 207 is down-turned and is shielded by the splay plates 208 which prevent rising gas from passing into the effluent. In this case as in the case of the constructions already described, the surface 204 of the sewage in the chamber 205 is broken up and agitated by the inflowing aerified sewage, and sludge is deposited in the annular sludge pit and the gas evolved passes upward into the top of the tank. The flow of the sewage from the septum vents 210 (which correspond with the vents 6) is diagonally upward toward the center of the chamber 8.

In Fig. 4, the incoming aerated sewage is distributed over the surface 301 of the sewage contained in the annular sedimenting chamber 302. It enters through the pipe 303 and sprinklers 304, and flows in the direction shown by the arrow, under the annular septum 305 upwardly, and over the sill 306 of the ring gutter 307, precipitated matters passing into the sludge chamber 308. Said chamber is fitted with a heater service 309 corresponding with the heater service 24 indicated in Fig. 1, and is also fitted with sludge spray pipes 311 which serve the same purpose as the sludge spray pipes 104 shown in Fig. 2. The two storied construction of tank is already well known and no novelty is claimed for the two-storied feature. In respect of this particular apparatus the invention consists in the combination with a tank of the two-storied (or three-storied) type of a structure admitting the aerification of the inflowing sewage, its distribution over the surface of sewage contained in the receiving chamber of the tank, its transfer by flow downward and transversely therefrom to the effluent vent, and the deposition and retention of the sludge. But in this construction one difference is involved, and that is that the transverse flow of the sewage is not (as in the other constructions already described) utilized to disturb the upper layers of the sludge so as to promote the discharge of gas therefrom. 312 is the effluent pipe, the end of which forms a trap 313 set in the pit 314 forming part of the ring gutter 307.

In every case the lower edges of the septa or baffles under which the sewage flows are serrated as indicated in the fragment sketch (Fig. 5) so as to insure a distribution of the sewage over the whole area of the tank when outflowing as well as inflowing, thereby to insure maintenance of uniform operation conditions throughout the tank during the purification process.

It is obviously desirable that the structure of the tank, in whatever form it is used, shall be so proportioned that the mass of the sludge is not unnecessarily agitated so as to bring raw portions of it into pseudo solution or suspension. It is unavoidable that a small amount of light sludge matter and matter in pseudo suspension will be carried off with the effluent, and that such matter may operate with some disadvantage in filtration or subsequent oxidizing treatment; and it is particularly for that reason desirable that air should be introduced into the effluent as shown at 106 (Fig. 2) so as to condition the effluent to a greater or less extent for subsequent treatment.

The maintenance of aerobic conditions within the tank is found to promote in a substantial measure the evolution of combustible gases and to procure rapid and effectual purification of the sewage without producing excessive volumes of sludge or objectionable thicknesses of scum. This system of process and apparatus is therefore double purposed, in that it aims both for the purification of the sewage and for the production from the sewage of a large volume of combustible gas. Apart from its utility as a source of power, heat and light, this gas is immediately applied to very great advantage, particularly in cold climates, for the purpose of maintaining in the tank a temperature at which appropriate micro organisms will flourish, and at the same time may also be used as a source of energy for introducing air into the inflowing sewage to oxygenate it preparatory to its introduction into the treatment chambers. The sewage system is thus made self contained.

The invention is not concerned with the particular design of the heating or air forcing appliances, which may be of any known type adapted to take their heat from a gas burner.

What I claim as my invention and desire to secure by Letters Patent is:—

1. A process for purifying sewage, which consists in passing sewage into a purification tank, charging the incoming sewage with air, distributing the aerated sewage over the surface of sewage contained on one side of a septum in the purification tank, which septum leaves a sewage passage past the septum, subjecting sewage in said tank to bacterial action while it is flowing therethrough, and finally, withdrawing liquid effluent continuously from a place in said tank rearward of said septum, and periodically removing sludge accumulated in said tank.

2. A process for purifying sewage and obtaining combustible gas therefrom, which consists in passing sewage into a closed purification tank charging the incoming sewage with a regulated proportion of air, distributing the aerated sewage over the surface of sewage contained on one side of the septum in the closed purification tank, which septum leaves a sewage passage past the septum, permitting the sewage to flow through said tank and under the septum therein while subject to bacterial action, withdrawing the liquid effluent continuously from a place in said tank rearward of said septum, educting gas from the upper part of said tank, and periodically removing sludge accumulated in said tank.

3. A process for purifying sewage which is characterized by the charging of the sewage with air during its passage toward a tank, the introduction of the aerated sewage over the surface of sewage contained in the tank, the downward movement of sewage in said tank while it is subject to bacterial resolution, the continuous discharge of the effluent, and the periodical withdrawal of sludge.

4. A process for purifying sewage, which consists in charging sewage with air during its passage to a closed tank, distributing the aerated sewage over the surface of sewage at one side of a septum in the closed tank, which septum leaves a sewage passage past the septum, maintaining the temperature of the sewage in said tank within a range favorable to bacterial action, permitting the sewage to flow downward through said tank, and under said septum, withdrawing liquid continuously from a place in said tank rearward of said septum, and periodically removing sludge accumulated in the bottom of said tank.

5. The process for purifying sewage by bacterial action, which consists in charging flowing sewage with air, distributing the aerated sewage over the surface of sewage in a closed tank, causing the sewage in said tank to flow downward through said tank, and through a passage, under a septum therein, and over sludge accumulated in the bottom of said tank, and continuously discharging the effluent and periodically removing the sludge from said tank.

6. The process for purifying sewage by bacterial action and obtaining combustible gas therefrom, which consists in charging flowing sewage with a regulated quantity of air, distributing the aerated sewage over the surface of sewage in a closed tank, causing said sewage to flow downward through said tank and traverse the upper layer of sludge accumulating in the bottom of said tank and maintain a disturbed condition therein, educting the effluent continuously at another place in said tank out of the course of the sewage flow therein and there agitating it, educting gas from the upper part of the tank, and periodically removing the sludge accumulated in the bottom of said tank.

7. A process for purifying sewage, which consists in charging flowing sewage with air, distributing the aerated sewage over the surface of sewage contained in a purification tank at one side of a septum therein causing said sewage to flow downward and through a passage under said septum and thence over sludge deposited at the other side of said septum and during such flow submitting the sewage to aerobic bacterial action; and finally, withdrawing the liquid effluent continously, and removing the accumulated sludge periodically.

8. A process for purifying sewage by aerobic bacterial action in a closed tank, characterized by the charging of flowing sewage with a regulated quantity of air, the distributing of such aerated sewage over the surface of sewage detained in said tank, the transfer of sewage by flowing downwardly in said tank at one side of a septum therein and then transversely through a passage beneath the septum and through the upper strata of the accumulated sludge to an eduction vent, thereby to submit said sludge to gentle disturbance and promote the release of gas therefrom.

9. A process for purifying sewage wherein flowing sewage is aerated and distributed over the top of the sewage detained in a sewage tank, said sewage being aerated in its passage to the tank and being caused to flow downward through said tank while undergoing bacterial action, and thence to the point of effluent discharge.

10. A tank for the bacterial purification of sewage and the generation of combustible gas, consisting essentially of a covered chamber having sewage inlets disposed near the top of same adapted to distribute inflowing aerated sewage over the surface of the sewage contained in said chamber, means for aerating the sewage prior to its entry to the chamber, a septum in said chamber less than the full depth of said chamber, a pit at the bottom of said chamber adapted to hold accumlated sludge, a non-return air inlet valve and a gas eduction vent above the sewage level in said chamber, and a sewage eduction vent rearward of said septum so disposed in relation to said septum as to cause the downflowing sewage to pass across the top of the sludge pit in its course to said eduction vent.

11. A sewage purifying tank having a transverse septum in the upper part of same and a sludge chamber below said septum, means for aerating sewage prior to its entry to the chamber and introducing the sewage into said tank at one side of said septum above the surface of the sewage contained in said tank, and an eduction vent in a part of said tank rearward of said septum and above the sludge chamber.

12. A sewage purifying and sewage gas generating apparatus comprising a covered tank having a transverse septum in its upper part and a sludge chamber below said septum, means for aerating sewage prior to its entry to the tank and introducing it into said tank at the near side of said septum above the surface of sewage contained in said tank, a non return air inlet valve and a gas eduction valve in the upper part of said tank, and a sewage eduction vent in the side of said tank opposite to the rear side of said septum and above the sludge chamber, a sewage passage past the septum being provided.

13. A sewage purifying tank having a transverse septum in the upper part of the same and a sludge chamber below said septum, means for aerating sewage prior to its entry to the tank and introducing the same into said tank at one side of said septum above the surface of the sewage contained in said tank, an eduction vent in a part of the tank rearward of said septum and above the sludge chamber, and means for raising the temperature of the sewage thereby to promote bacterial resolution thereof in the said tank.

14. A sewage purifying and sewage gas generating apparatus comprising a tank having a transverse septum in the upper part of the same and a sludge chamber below and rearward of said septum, means for aerating sewage prior to its entry to the tank and introducing the same into said tank at the near side of said septum above the surface of the sewage contained in said tank, an eduction vent in a part of said tank rearward of said septum and above said sludge chamber, a gas tight cover on said tank, and a gas eduction vent and a non return air inlet valve in said cover.

In testimony whereof I have signed my name to this specification in the presence of two subscribing witnesses.

HORACE FLICKER.

Witnesses:
W. J. DAVIS,
H. C. CAMPBELL.